Patented May 30, 1933

1,911,505

UNITED STATES PATENT OFFICE

PAUL HEROLD AND GUSTAV A. KRAJEWSKI, OF LEUNA, GERMANY, ASSIGNORS TO I. G. FARBENINDUSTRIE AKTIENGESELLSCHAFT, OF FRANKFORT-ON-THE-MAIN, GERMANY

RECOVERY OF MOLYBDENUM AND SIMILAR METALS

No Drawing. Application filed April 9, 1932, Serial No. 604,346, and in Germany December 17, 1930.

The present invention is a continuation-in-part of application Ser. No. 580,491, filed December 11th, 1931, and relates to the recovery of molybdenum, tungsten and vanadium from ores and other crude material containing same.

In order to obtain molybdenum and tungsten from materials containing these elements as sulphides, such as ores or industrial residues, it has been proposed to heat the initial materials with chlorine or hydrogen chloride or gases containing the same with an addition of oxygen or gases containing the same, such as air, to convert the said metals into volatile oxychlorides. This process proceeds rather slowly at temperatures below about 400° C.

We have now found that the said process may be carried out sufficiently rapidly on a technical scale even at temperatures below 400° C. if the said materials containing molybdenum or tungsten as sulphides are treated with chlorine or hydrogen chloride or gases containing at least one of the same with an addition of oxygen or gases containing the same in the presence of not completely volatilizable carbonaceous substances. The amount of oxygen present in the gas should as a rule be from 3 to 10 per cent, by volume. The temperatures to be employed range between 250° and 400° C., preferably between 330° and 350° C.

As carbonaceous substances suitable for being admixed with the said sulphidic compounds of molybdenum and tungsten may be mentioned solid materials such as coals of all varieties, for example mineral coal or brown coal, charcoal of vegetable or animal origin, or peat or lignite coke or semi-solid or liquid substances, such as pitch, tars or heavy oils.

The carbonaceous admixture may be present in the crude materials from the start, such as is the case with many exhausted catalytic masses, as for example those from the destructive hydrogenation of coal. If this is not the case, carbonaceous substances, for example lignite coke, wood charcoal, carbonized products such as carbon from molasses or the like, are added to the initial materials before the chlorinating treatment.

The amount of additional substance added may be varied within wide limits. It is preferable to employ at least one fifth of the amount of the metalliferous material to be worked up.

The same method may also be used for working up masses containing vanadium in the form of its sulphides. In this case the chlorination proceeds quickly and completely at temperatures of about 300° C.

The not completely volatilizable carbonaceous substances to be employed according to the present invention appear to exert a catalyzing action on the formation of chlorides without being converted themselves in the reaction. It seems improbable that under the conditions of working the said carbonaceous substances exert a reducing action since free oxygen is additionally supplied. But we wish to be understood that we do not restrict ourselves to this theory.

The valuable metals may be volatilized so that only a fraction of one per cent remains in the residue and may be recovered in a simple manner. The process is advantageously carried out on the counter current principle and while re-employing the unexhausted reaction gases in circulation, if desired after removal of gaseous by-products such as sulphur dioxide, sulphur chloride, sulphuryl or thionyl chloride or the like by washing or adsorption.

The further working up of the resulting volatile metal compounds is preferably effected by decomposition of the readily decomposable chlorine compounds with water or steam, the metal oxides or acids thus formed being finished off in any desired manner.

The advantages of working at the said very low temperatures are considerable. For example the process also allows of the employment of crude materials which contain other metals which form volatile chlorides, such as iron, aluminium and zinc, as well as the said metals. The valuable chlorine compounds to be recovered are scarcely contaminated by the chlorides of these other metals because the volatility of zinc chloride at the temperatures employed is very slight and the formation of the readily volatile chlorides of iron and aluminium from the sulphides present in the crude material takes place but slowly under the mild working conditions.

Furthermore there is the advantage of economy in the heating material when selecting the constructional material for the reaction chamber because this has no unusual requirements to fulfill as regards stability to heat. Certain nickel alloys, especially nickel copper alloys, such as Monel metal, and special steels containing nickel and chromium, as for example V2A steel, are especially advantageous as the constructional material. These materials are distinguished by great chemical resistance and undergo no appreciable attack, for example in the form of stirring arms and promoting means, even when used for several months and in spite of the great reactivity of the gases. They are therefore substantially superior for example to cast iron and cast silicon, materials which generally speaking have a good resistance to chemical attack.

The following examples will further illustrate the nature of this invention, but the invention is not restricted to these examples.

Example 1

A catalyst used in the destructive hydrogenation of carbonaceous materials, such as tar, and consisting substantially of the sulphides of zinc, molybdenum and magnesium contaminated by large amounts of asphaltic and resinous substances is first subjected to low temperature carbonization. It then contains about 20 per cent of carbonized substances. The mass is then led through a rotary tubular furnace at 320° C. while passing chlorine gas to which 3 per cent of oxygen has been added in counter current. The molybdenum evaporates in the form of its oxychloride; this is carried along by the hot stream of chlorine into a cooled chamber wherein it separates as a loose powder. The gases are led back again to the rotary furnace after washing with water. The solid residue only contains 0.3 per cent of molybdenum.

Also a chlorine gas having a greater content in oxygen may be used; thus in the aforesaid treatment a gas containing 10 per cent of oxygen may be employed.

Example 2

A small grained catalytic mass (consisting of a mixture of the sulphides of vanadium and cobalt) which has been employed for the catalytic reduction of phenolic oils and which has become inactive is introduced continually into a rotary tubular furnace which is kept at 260° C. together with the same amount of charcoal. At the same time a mixture of equal parts of chlorine gas and air is introduced in large amounts at the other end of the furnace in counter current to the charge. The vanadium is almost entirely taken up by the excess of chlorine gas in the form of the volatile chlorine compound and is isolated as described in Example 1.

With the same success a waste catalyst consisting substantially of compounds of tungsten with sulphur may be worked up.

What we claim is:—

1. In the working up of a crude material containing a sulphide of a metal of the group consisting of molybdenum, tungsten and vanadium, the step of treating said material at a temperature between 250° and 400° C. and in the presence of a not completely volatilizable carbonaceous substance with a gas containing free oxygen and at least one of the agents chlorine and hydrogen chloride.

2. In the process as claimed in claim 1 working up a material containing a sulphide of molybdenum.

3. In the process as claimed in claim 1 working up a material containing a sulphide of tungsten.

4. In the process as claimed in claim 1 working up a material containing a sulphide of vanadium.

5. In the working up of a crude material containing a sulphide of a metal selected from the group consisting of molybdenum, tungsten and vanadium, the step of treating said sulphide at a temperature between 250° and 400° C. and in the presence of a not completely volatilizable carbonaceous substance with a gas containing free oxygen and chlorine.

In testimony whereof we have hereunto set our hands.

PAUL HEROLD.
GUSTAV A. KRAJEWSKI.